United States Patent
Elkins

(10) Patent No.: US 12,123,545 B2
(45) Date of Patent: Oct. 22, 2024

(54) SPRING-BIASED THREADED ROD CLAMP

(71) Applicant: Kyle William Elkins, Temperance, MI (US)

(72) Inventor: Kyle William Elkins, Temperance, MI (US)

( * ) Notice: Subject to any disclaimer, the term of this patent is extended or adjusted under 35 U.S.C. 154(b) by 0 days.

(21) Appl. No.: 18/304,896

(22) Filed: Apr. 21, 2023

(65) Prior Publication Data
US 2024/0151349 A1 May 9, 2024

Related U.S. Application Data

(60) Provisional application No. 63/382,943, filed on Nov. 9, 2022.

(51) Int. Cl.
*F16M 13/02* (2006.01)
*F16B 2/10* (2006.01)
*F16L 3/11* (2006.01)

(52) U.S. Cl.
CPC ............. *F16M 13/022* (2013.01); *F16B 2/10* (2013.01); *F16L 3/11* (2013.01)

(58) Field of Classification Search
CPC .. F16M 13/022; F16B 2/10; F16L 3/11; F16L 3/245
USPC ...... 248/62, 231.85, 228.7, 217.2, 544, 318, 248/237, 228.4
See application file for complete search history.

(56) References Cited

U.S. PATENT DOCUMENTS

| | | | | |
|---|---|---|---|---|
| 494,868 | A | * 4/1893 | Kelly | E06C 1/381 182/189 |
| 1,134,395 | A |   4/1915 | Loepsinger | |
| 1,536,361 | A | * 5/1925 | Tomes | A47G 1/1653 248/228.4 |
| 2,346,338 | A | * 4/1944 | Sway | F16B 45/06 24/598.5 |
| 2,364,477 | A | * 12/1944 | Sayles | F16L 3/24 248/58 |
| 2,408,719 | A | * 10/1946 | Abernethy | E04G 5/041 248/317 |
| 2,570,666 | A | * 10/1951 | Haagensen | E04G 17/18 249/211 |
| 3,041,102 | A | * 6/1962 | Day | A01M 23/265 294/19.3 |
| 3,314,636 | A | * 4/1967 | McHugh | A63G 9/12 297/181 |
| 3,327,376 | A | * 6/1967 | Freeman | A47F 5/0006 24/456 |

(Continued)

*Primary Examiner* — Muhammad Ijaz
(74) *Attorney, Agent, or Firm* — Dunlap Bennett & Ludwig, PLLC; Anna L. Kinney

(57) ABSTRACT

A spring-biased clamp includes a threaded rod; a load assembly mounted to a first end of the rod; a stop disk mounted to the second end; and a jaw assembly near the second end. The jaw assembly includes opposing jaws hinged together. The jaw assembly travels on the threaded rod. A method of suspending a load includes raising the clamp towards a ceiling structure; applying force to press the first and second jaws against an attachment point, spreading them; advancing the jaws until the torsion spring draws them together; and rotating the threaded rod until the stop disk contacts the attachment point. A weighted load is then attached to the load assembly. Loads can be quickly and safely secured with the clamp to the ceiling structure from the ground without elevating the installer.

9 Claims, 4 Drawing Sheets

(56) References Cited

U.S. PATENT DOCUMENTS

| | | | | |
|---|---|---|---|---|
| 3,612,459 A * | 10/1971 | Walls | F16B 45/06 | 248/340 |
| 4,065,090 A * | 12/1977 | Mauney | E04B 9/006 | 248/318 |
| 4,074,885 A * | 2/1978 | Hacker, Jr. | E04B 9/006 | 24/326 |
| 4,135,692 A * | 1/1979 | Ferguson | A47G 7/045 | 248/228.7 |
| 4,163,576 A * | 8/1979 | Hoop | F21V 21/02 | 294/92 |
| 4,238,098 A * | 12/1980 | Siegfried | F16L 3/24 | 248/228.7 |
| 4,318,525 A * | 3/1982 | Welch | F16M 13/027 | 248/228.7 |
| 4,417,713 A * | 11/1983 | Snowden | A62B 35/0068 | 248/228.4 |
| 5,947,875 A * | 9/1999 | Cone | A47D 13/107 | 482/904 |
| 6,012,691 A | 1/2000 | van Leeuwen et al. | | |
| 6,102,341 A | 8/2000 | Ball | | |
| 6,254,040 B1 | 7/2001 | McGrath | | |
| 6,648,411 B2 * | 11/2003 | Julien | A47D 13/105 | 297/274 |
| 8,857,771 B2 | 10/2014 | Streetman | | |
| 9,093,827 B2 | 7/2015 | Kushnick | | |
| 10,004,926 B2 * | 6/2018 | Ostrobrod | A62B 35/0068 | |
| 10,988,927 B2 | 4/2021 | Gloftis et al. | | |
| 11,098,825 B2 | 8/2021 | Juzak et al. | | |
| 11,181,211 B1 | 11/2021 | Morgan | | |
| 2005/0045785 A1 | 3/2005 | Cohen | | |
| 2005/0258315 A1 | 11/2005 | Bigham | | |
| 2006/0138286 A1 * | 6/2006 | Connolly | F16L 3/133 | 248/62 |
| 2007/0163834 A1 * | 7/2007 | Casebolt | A62B 1/04 | 182/3 |
| 2013/0126681 A1 * | 5/2013 | Greenfield | F16L 3/11 | 248/62 |
| 2013/0206927 A1 * | 8/2013 | Greenfield | F16L 3/20 | 248/58 |
| 2015/0304487 A1 * | 10/2015 | Chaput | F16B 2/10 | 29/854 |
| 2016/0356050 A1 * | 12/2016 | Tsaousis | E04G 5/045 | |
| 2018/0104519 A1 * | 4/2018 | Ostrobrod | A62B 35/0068 | |
| 2020/0291973 A1 * | 9/2020 | Gassaway | F16B 2/10 | |
| 2021/0080033 A1 * | 3/2021 | Belen | F16B 39/108 | |
| 2021/0278027 A1 * | 9/2021 | Schmitt | F16L 59/135 | |
| 2022/0128172 A1 * | 4/2022 | Harris | F16L 3/11 | |
| 2024/0151349 A1 * | 5/2024 | Elkins | F16L 3/11 | |

* cited by examiner

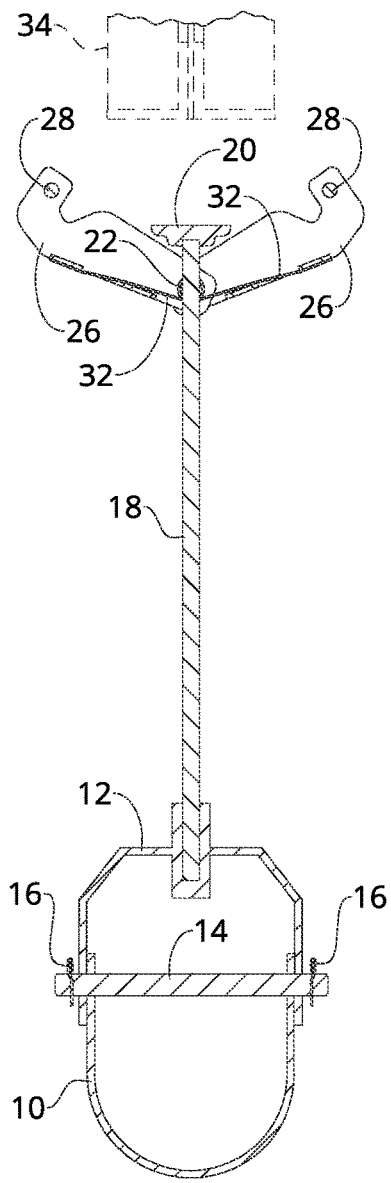
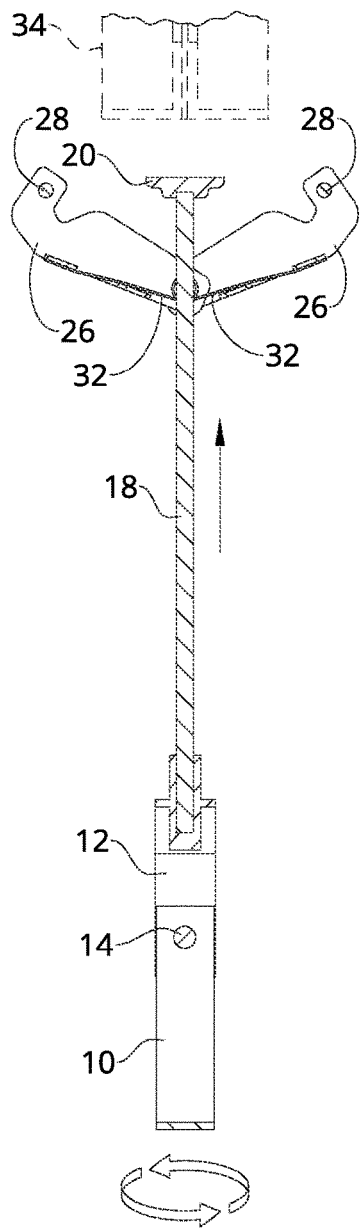
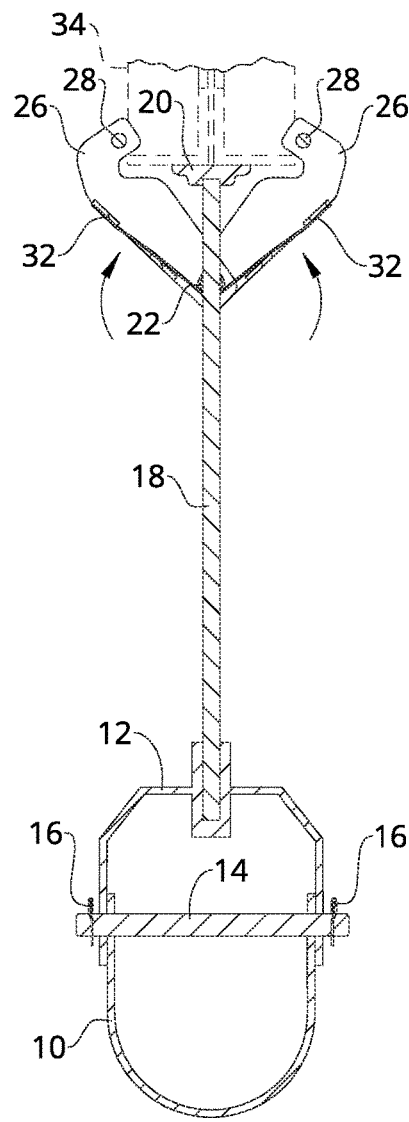
FIG.5
FIG.6
FIG.7

SPRING-BIASED THREADED ROD CLAMP

CROSS-REFERENCE TO RELATED APPLICATION

This application claims the benefit of priority of U.S. provisional application No. 63/382,943, filed Nov. 9, 2022, the contents of which are herein incorporated by reference.

BACKGROUND OF THE INVENTION

The present invention relates to a means of installing suspended material during industrial/commercial maintenance and construction and, more particularly, to a weight-bearing, spring-loaded threaded rod clamp therefor.

In every commercial and industrial building, there are key components necessary to its operation suspended from the ceiling with threaded rod including, but not limited to, heating, ventilation, and air conditioning (HVAC) components, electrical conduit, power pipe, process pipe, fire suppression systems, multi-purpose strut trapeze hangers, and plumbing.

The components are suspended from the ceiling structure with threaded rod of varying sizes. This threaded rod may be attached to the ceiling structure by multiple different methods. However, each current method and product requires the installer to reach the point of attachment with the hardware and required tools, regardless of the environment, including surrounding barriers and obstructions.

Maintaining, repairing, or installing new power and process utilities may be dangerous and unnecessarily challenging. Often the ceiling may not be physically or safely accessible due to overhead obstructions between the installer and the attachment point. Other issues may include an unsafe climate (e.g., excessive heat, poor chemical vapor ventilation), a tight space or very limiting ceiling filled with obstructions, and a crowded floor that limits space for an adequate ladder or aerial lift.

Generally, in an industrial setting, the equipment is kept close to the ceiling to maintain overhead clearance for future additions and to maintain clearance. In commercial applications, it may also be installed tight to the overhead or above a finished drop-ceiling.

Common installation practice and every currently available device used to secure the threaded rod, such as a beam clamp or similar hanging device, require the tradesman or installer to reach the point of attachment to physically tighten down the clamp. This can be very challenging and/or hazardous. Reaching a ceiling that has many structures or existing electrical, venting, HVAC, fire suppression, power and process piping, and other mechanical systems on the ground and hanging from the ceiling already in place seriously risks safety, is costly, and is very time consuming. Oftentimes, heavy material is left insufficiently supported due to inaccessibility to an adequate attachment point.

As can be seen, there is a need for a threaded rod clamp that can be operated and installed from the safety and convenience of the ground or from a secure platform.

SUMMARY OF THE INVENTION

In one aspect of the present invention, a spring-biased clamp comprises a threaded rod having a first end and a second end; a load assembly mounted to the first end; a stop disk mounted to the second end; and a jaw assembly proximate the second end, comprising a first jaw and a second jaw hingedly coupled in opposing relationship, the jaw assembly being configured to travel on the threaded rod.

In another aspect of the present invention, a method of suspending a load includes raising the spring-biased clamp towards a ceiling structure with the second end of the threaded rod facing an attachment point; applying force to press the first and second jaws against the attachment point, thereby spreading the first and second jaws; advancing the jaws until the torsion spring draws the first and second jaws together; rotating threaded rod until the disk contacts the attachment point; and attaching a weighted load to the load assembly.

The clamp disclosed herein eliminates the need for a worker to access the attachment point of a threaded rod to a ceiling structure in an unsafe and elevated area. The worker can do so quicker and much safer from the ground with minimal to no tools. The hanging devices may be placed and secured from the ground without the need for a device to elevate the installer.

These and other features, aspects and advantages of the present invention will become better understood with reference to the following drawings, description, and claims.

BRIEF DESCRIPTION OF THE DRAWINGS

FIG. 5 is a sectional view taken along line 5-5 of FIG. 3;

FIG. 6 is a sectional view showing the motion of the handle; and

FIG. 7 is a sectional view showing the motion of the jaws.

DETAILED DESCRIPTION OF THE INVENTION

Figure 1:
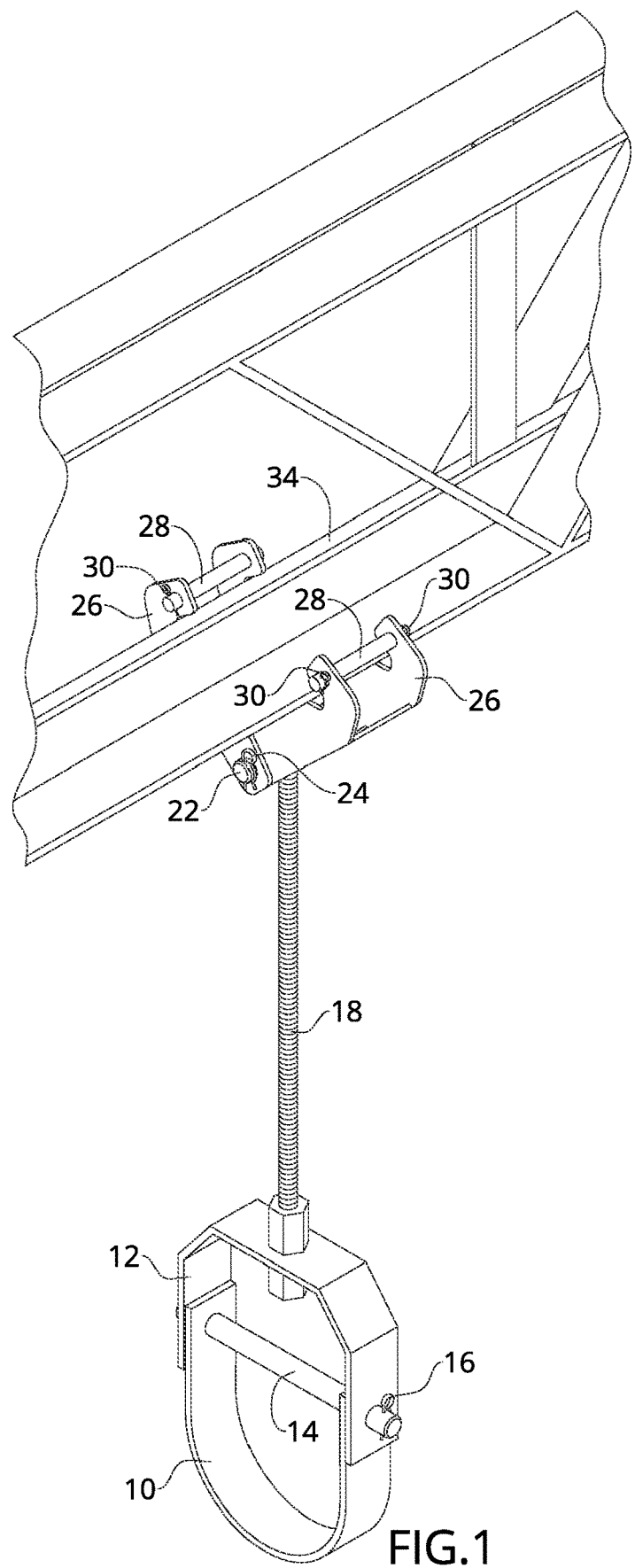
FIG. 1 is a perspective view of a clamp device according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a spring-loaded or spring-biased threaded rod clamp comprising two jaws attached by a single pivoting hinge at a base. The two jaws may also be connected by a tension spring that draws them together.

After a threaded rod is inserted into the base of the pivot hinge, an installer may raise the clamp with the mouth facing towards the ceiling structure. Once the installer has visually located the attachment point, the installer may apply upward force to the threaded rod. In an initial condition, the jaws are slightly parted. With the mouth of the clamp in contact with the structure, the upward pressure opens the jaws of the clamp. Once the mouth of the clamp has passed the widest portion of the structure, a tension spring draws the jaws back together, clamping the device onto the structure. The threaded rod may be tightened until it contacts the bottom of the ceiling structure. Torque applied to the threaded rod locks the clamp in place. After the clamp is locked in place, a weighted load may be attached to the newly suspended rod.

In some embodiments, the clamp may be used for rigging. By replacing the threaded rod with an "eye-bolt", an installer may attach rigging equipment such as a chainfall to the clamp.

The clamp device may be used with a variety of structural supports, such as an I-beam, an H-Beam, a bar joist, a Z purlin, a channel, or a unistrut.

The clamp may have symmetrical jaws. In some embodiments, the jaws may be asymmetrical, for example to mount to the flat side of a Z-purlin structure. The clamp device comprises rods, pins, and the like that may be fastened in place with suitable fasteners known in the art, such as retaining rings, cotter pins, and the like, without inhibiting rotational movement of the components within which they are fastened.

The material of manufacture is not particularly limited. For example, the clamp may be made from stainless steel or carbon steel. In some embodiments, the clamp may have a galvanized coating to withstand caustic environments. The pivoting rod may be made, for example, from about 0.5" to about 1" round stock with a female threaded tap through the center.

The method of manufacture is not particularly limited. The jaws may be punched or cast from steel in a predetermined shape. The spring located on the pivot pin or pivot rod may be attached to the jaws. A right-hand American National Standards Institute (ANSI) B1.1 Unified Coarse Thread (UNC) female thread in a size consistent with the size of the threaded rod (e.g., 0.250, 0.375, 0.500, 0.625, or 0.750 inch) may be tapped into the pivot hinge/pivot rod to accommodate the threaded rod.

Referring to FIGS. 1 through 7, FIG. 1 shows a clamp device according to an embodiment of the present invention securely suspended from a beam 34. A handle assembly is mounted at a first end of a threaded rod 18 and a stopping nut with a circular plate or a shoe 20 is mounted to a second end of the threaded rod 18 opposite the first end (more clearly seen in FIG. 3). A jaw assembly is threadedly mounted to the threaded rod 18 proximate the second end.

Figure 2:
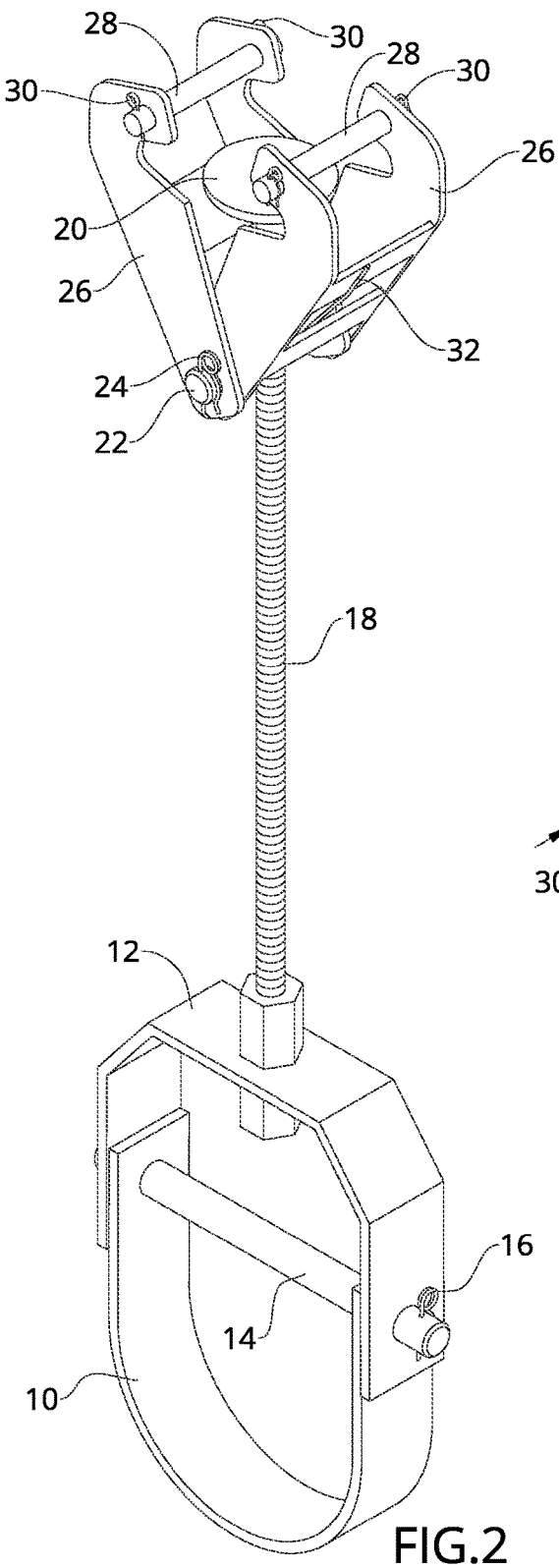
FIG. 2 is another perspective view thereof.
Figure 3:
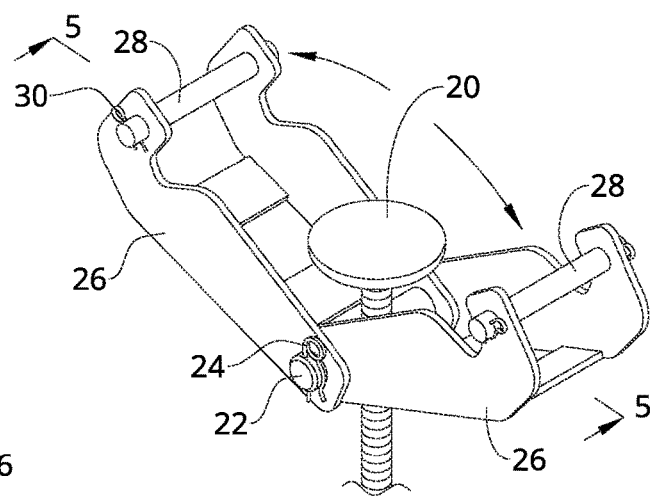
FIG. 3 is a detail perspective view thereof, shown with the jaws open.
Figure 4:
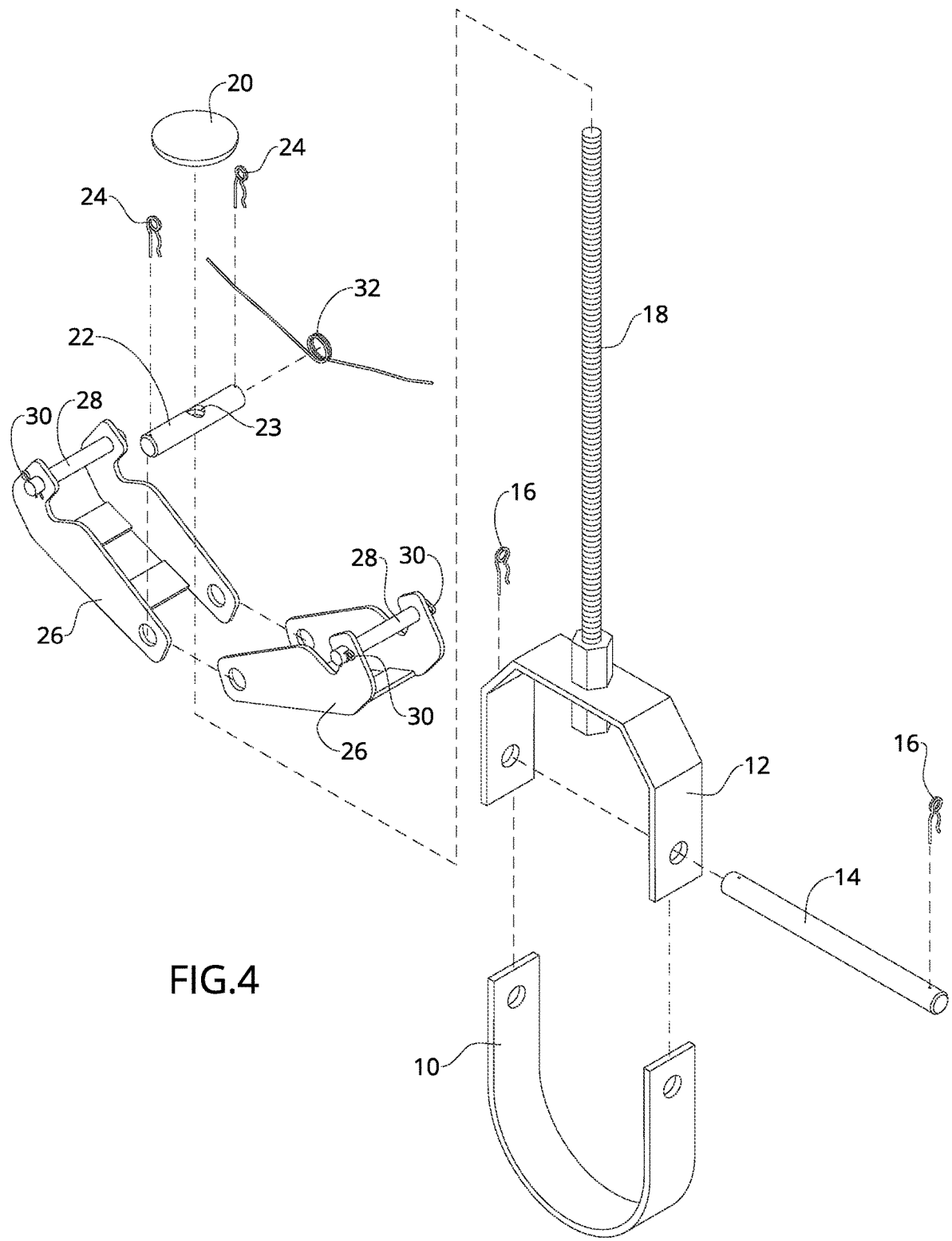
FIG. 4 is an exploded view thereof.

FIGS. 2 through 4 illustrate the handle assembly including a U-shaped handle 10 coupled to a handle fork 12 by way of a handle rod 14 fastened in place with cotter pins 16. The shoe 20 is operative to stop the threaded rod from further travel through a gap in the beam 34.

The jaw assembly comprises a pair of jaw frames 26, each having parallel arms joined by cross slats. A bore formed in an end of each of the parallel arms accommodates a jaw rod 28, fastened with a jaw cotter pin 30 adjacent an exterior surface of each parallel arm. The jaw frames 26 are pivotally coupled to a clamp base rod 22 or pivot pin, which is fastened in place with cotter pins 24 or retaining rings. A torsion spring 32 mounted to the base rod 22 is threaded through lateral slats of the jaw frames 26 as shown in FIG. 2.

The threaded rod 18 is mated with a threaded bore 23 formed in the base rod 22. The threaded rod 18 sets opposing pressure to the jaw frames 26 to lock the jaw assembly in place on the beam 34. The shoe 20 enables application of further torque to provides jaw tension. The shoe 20 is also operative to stop the threaded rod from further travel through a gap in the beam 34. The torsion spring 32 urges the jaw frames 26 together on the beam 34.

As the handle 10 is rotated, the threaded rod 18 advances through the threaded bore 23, extending the shoe 20 upward against the beam 34, as shown in FIGS. 5-6. The spring 32 draws the jaw frames 26 together around the beam 34; see FIG. 7.

It should be understood, of course, that the foregoing relates to exemplary embodiments of the invention and that modifications may be made without departing from the spirit and scope of the invention as set forth in the following claims.

What is claimed is:

1. A spring-biased clamp comprising:
 a threaded rod having a first end and a second end;
 a load assembly mounted to the first end;
 a stop disk mounted to the second end; and
 a jaw assembly proximate the second end, comprising a first jaw and a second jaw hingedly coupled in opposing relationship, the jaw assembly being configured to travel on the threaded rod.

2. The spring-biased clamp of claim 1, wherein the first and second jaws are symmetrical.

3. The spring-biased clamp of claim 1, wherein the first and second jaws are asymmetrical.

4. The spring-biased clamp of claim 1, wherein the load assembly comprises a handle fork joined to the first end of the threaded rod; and a U-shaped handle coupled to the handle fork.

5. The spring-biased clamp of claim 1, wherein the threaded rod is an eyebolt.

6. The spring-biased clamp of claim 1, wherein the jaw assembly further comprises a pivot rod hingedly coupling the first jaw and the second jaw, the pivot rod having a threaded through hole rotatably coupled to the threaded rod.

7. The spring-biased clamp of claim 6, further comprising a torsion spring mounted to the pivot rod and configured to provide pivoting bias to the first and second jaws.

8. A method of suspending a load, comprising:
 raising the spring-biased clamp of claim 1 towards a ceiling structure with the second end of the threaded rod facing an attachment point;
 applying force to press the first and second jaws against the attachment point, thereby spreading the first and second jaws;
 advancing the first and second jaws until a torsion spring draws the first and second jaws together;
 rotating the threaded rod until the stop disk contacts the attachment point; and
 attaching a weighted load to the load assembly.

9. The method of claim 8, further comprising attaching rigging equipment to the threaded rod, wherein the threaded rod is an eyebolt.

\* \* \* \* \*